(12) United States Patent
Jiang et al.

(10) Patent No.: US 10,972,908 B2
(45) Date of Patent: *Apr. 6, 2021

(54) WIRELESS NETWORK CONNECTION METHOD, APPARATUS, AND SYSTEM

(71) Applicant: TENCENT TECHNOLOGY (SHENZHEN) COMPANY LIMITED, Guangdong (CN)

(72) Inventors: Peng Jiang, Guangdong (CN); Shaofei Ju, Guangdong (CN); Jinkai Mai, Guangdong (CN); Shichuan Liu, Guangdong (CN); Yanjun Luo, Guangdong (CN); Linpeng Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 38 days.

This patent is subject to a terminal disclaimer.

(21) Appl. No.: 16/681,451

(22) Filed: Nov. 12, 2019

(65) Prior Publication Data
US 2020/0084621 A1  Mar. 12, 2020

Related U.S. Application Data

(63) Continuation of application No. 15/362,479, filed on Nov. 28, 2016, now Pat. No. 10,506,428, which is a
(Continued)

(30) Foreign Application Priority Data

May 29, 2014  (CN) .......................... 201410234095.3

(51) Int. Cl.
*H04L 29/06* (2006.01)
*H04W 12/04* (2021.01)
(Continued)

(52) U.S. Cl.
CPC .......... *H04W 12/04* (2013.01); *H04W 12/02* (2013.01); *H04W 76/11* (2018.02);
(Continued)

(58) Field of Classification Search
CPC .............................. H04W 76/11; H04W 12/02
See application file for complete search history.

(56) References Cited

U.S. PATENT DOCUMENTS

| 2005/0054369 A1 | 3/2005 | Murakami |
| 2012/0158922 A1* | 6/2012 | Aggarwal ............. H04W 12/50 709/220 |

(Continued)

FOREIGN PATENT DOCUMENTS

| CN | 1388479 A | 1/2003 |
| CN | 101159500 A | 4/2008 |

(Continued)

OTHER PUBLICATIONS

International Search Report and Written Opinion of the ISA/CN for PCT/CN2015/080069, Haidian District, Beijing, dated Sep. 1, 2015, 12p.

(Continued)

*Primary Examiner* — Jeffrey C Pwu
*Assistant Examiner* — Thong P Truong
(74) *Attorney, Agent, or Firm* — Brinks Gilson & Lione (57) ABSTRACT

A wireless network connection method includes: scanning a graphical code to acquire graphical code information carried in the graphical code, the graphical code information including encryption information and the encryption information being used for acquiring configuration information of a wireless network; decrypting the encryption information to acquire the configuration information; and connecting to the wireless network by using the configuration information.

9 Claims, 5 Drawing Sheets

Related U.S. Application Data continuation of application No. PCT/CN2015/080069, filed on May 28, 2015.

(51) Int. Cl.
*H04W 12/02* (2009.01)
*H04W 76/11* (2018.01)
*H04W 84/12* (2009.01)
*H04W 12/77* (2021.01)

(52) U.S. Cl.
CPC ......... *H04L 2209/80* (2013.01); *H04W 12/77* (2021.01); *H04W 84/12* (2013.01)

(56) References Cited

U.S. PATENT DOCUMENTS

| | | |
|---|---|---|
| 2013/0097684 A1 | 4/2013 | Kim |
| 2014/0115708 A1* | 4/2014 | Terwilliger .......... G06K 7/1417 726/26 |

| | | |
|---|---|---|
| 2016/0057161 A1 | 2/2016 | Li et al. |
| 2017/0078876 A1 | 3/2017 | Jiang et al. |

FOREIGN PATENT DOCUMENTS

| | | |
|---|---|---|
| CN | 102254140 A | 11/2011 |
| CN | 102883322 A | 1/2013 |
| CN | 103139778 A | 6/2013 |
| CN | 103179640 A | 6/2013 |
| CN | 103310329 A | 9/2013 |
| CN | 103686426 A | 3/2014 |
| CN | 104602238 A | 5/2015 |
| WO | WO 2015/180666 A1 | 12/2015 |

OTHER PUBLICATIONS

Office Action dated Feb. 8, 2018 for Chinese Application No. 201410234095.3 with concise English Translation, 10 pages.
Office Action dated Sep. 3, 2018 for Chinese Application No. 201410234095.3 with concise English Translation, 11 pages.

* cited by examiner

WIRELESS NETWORK CONNECTION METHOD, APPARATUS, AND SYSTEM

CROSS-REFERENCE TO RELATED APPLICATIONS

This application is a continuation of U.S. patent application Ser. No. 15/362,479, filed on Nov. 28, 2016, which claims priority to International Application No. PCT/CN2015/080069, filed on May 28, 2015, which claims priority to Chinese Patent Application No. 201410234095.3, filed on May 29, 2014, all of which are hereby incorporated by reference in their entireties.

FIELD OF THE TECHNOLOGY

The present disclosure relates to the field of Internet technologies and in particular, to a wireless network connection method, apparatus, and system.

BACKGROUND OF THE DISCLOSURE

A wireless network (for example, a WiFi network) has become an indispensable communication tool, and at present, there are more and more intelligent devices, such as a mobile phone, a notebook computer, a tablet computer, and a camera device, supporting Internet surfing through a wireless network. At present, all of the intelligent devices connect to a wireless network in the following manner:

An intelligent device searches for a nearby wireless network, selects, according to an operation input by a user, a wireless network, receives password information input by the user, and then connects to the wireless network by using the password information.

In the foregoing technology, the user needs to input a password, and a password of a wireless network is usually complex, for example, a password including letters, numbers, and special symbols. In this way, a process of inputting a password by the user is very troublesome and even an input error may occur. Hence, a fast connection to a wireless network cannot be achieved in the foregoing technical solution.

SUMMARY

Embodiments of the present disclosure provide a wireless network connection method, apparatus, and system capable of achieving a fast connection to a wireless network.

In some aspects, the present disclosure provides a wireless network connection method, including:

scanning a graphical code to acquire graphical code information carried in the graphical code, the graphical code information including encryption information, and the encryption information being used for acquiring configuration information of a wireless network;

decrypting the encryption information to acquire the configuration information; and connecting to the wireless network by using the configuration information.

In some aspects, the present disclosure provides a wireless network connection method, including:

generating graphical code information including encryption information used for acquiring configuration information of a wireless network, and encoding the graphical code information to generate a graphical code; and issuing the graphical code to enable a user terminal to scan the graphical code to acquire the encryption information, decrypt the encryption information to acquire the configuration information, and connect to the wireless network by using the configuration information.

In some aspects, the present disclosure provides a wireless network connection method, including:

generating, by a server, graphical code information including encryption information used for acquiring configuration information of a wireless network, and encoding the graphical code information to generate a graphical code;

issuing, by the server, the graphical code;

scanning, by a user terminal, the graphical code to acquire the encryption information; and decrypting, by the user terminal, the encryption information to acquire the configuration information, and connecting to the wireless network by using the configuration information.

In some aspects, the present disclosure provides a wireless network connection apparatus, including an acquisition unit, a decryption unit, and a connection unit, where the acquisition unit is configured to scan a graphical code to acquire graphical code information carried in the graphical code, the graphical code information including encryption information, and the encryption information being used for acquiring the configuration information of a wireless network;

the decryption unit is configured to decrypt the encryption information to acquire the configuration information; and the connection unit is configured to connect to the wireless network by using the configuration information.

In some aspects, the present disclosure provides a wireless network connection apparatus, including a generation unit and an issuance unit, where the generation unit is configured to generate graphical code information including encryption information used for acquiring configuration information of a wireless network and encode the graphical code information to generate a graphical code; and the issuance unit is configured to issue the graphical code to enable a user terminal to scan the graphical code to acquire the encryption information, decrypt the encryption information to acquire the configuration information, and connect to the wireless network by using the configuration information.

In some aspects, the present disclosure provides a wireless network connection system, including a server and a user terminal, where the server is configured to generate graphical code information including encryption information used for acquiring configuration information of a wireless network and encode the graphical code information to generate a graphical code; and issue the graphical code; and the user terminal is configured to scan the graphical code to acquire the encryption information; and decrypt the encryption information to acquire the configuration information and connect to the wireless network by using the configuration information.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The technical solution of the present disclosure will be clearly and completely described in the following with reference to the accompanying drawings. It is obvious that the embodiments to be described are only a part rather than all of the embodiments of the present disclosure. All other embodiments derived by a person of ordinary skill from the embodiments of the present disclosure without creative efforts shall fall within the protection scope of the present disclosure.

In embodiments of the present disclosure, configuration information of a wireless network includes, but not limited to, a Service Set Identifier (SSID), an encryption manner, password information, and the like of the wireless network, where the encryption manner indicates an encryption manner of data when the data is transmitted by using the wireless network. In addition, in the embodiments of the present disclosure, a graphical code includes, but not limited to, a one-dimensional graph, a two-dimensional code, and the like; moreover, in the embodiments of the present disclosure, a wireless network may be a WiFi network.

Figure 1:
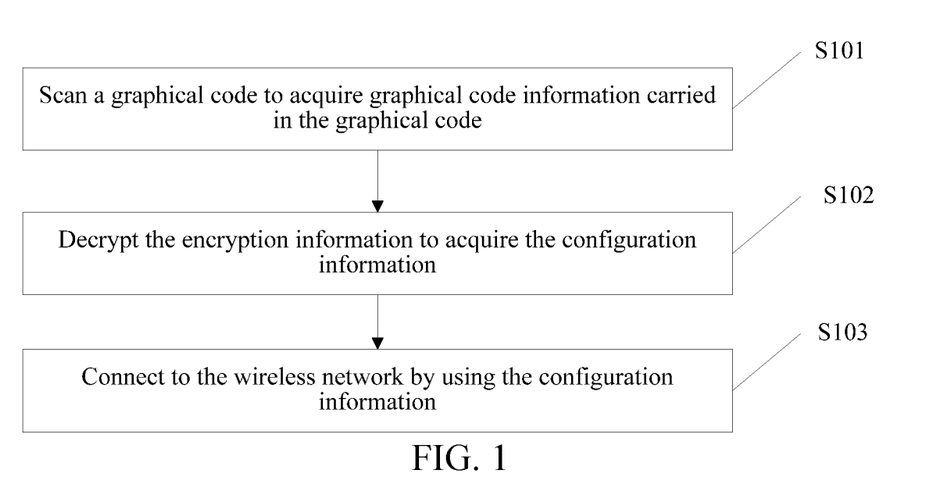
FIG. 1 is a flowchart of a wireless network connection method according to an embodiment of the present disclosure.

Referring to FIG. 1, FIG. 1 is a flowchart of a wireless network connection method according to an embodiment of the present disclosure, including:

S101: Scan a graphical code to acquire graphical code information carried in the graphical code, where the graphical code information includes encryption information, and the encryption information is used for acquiring the configuration information of a wireless network.

After the foregoing graphical code is scanned in step S101, the graphical code can be decrypted to acquire the foregoing graphical code information. In addition, the foregoing scanning a graphical code may be scanning a graphical code in a certain page, for example, scanning a graphical code issued by a server; alternatively, a graphical code on a certain object, for example, a graphical code adhered to a wall and the like, can be scanned, which is not limited in this embodiment.

Optionally, an encryption algorithm of the foregoing encryption information is a specific algorithm pre-negotiated by a server and a user terminal.

S102: Decrypt the encryption information to acquire the configuration information.

After the foregoing graphical code information is acquired, the foregoing encryption information can be acquired, so that step S102 may be decrypting the encryption information by using an encryption algorithm of the encryption information to acquire the foregoing configuration information, for example, performing decryption by using the specific algorithm pre-negotiated by the server and the user terminal as introduced above.

S103: Connect to the wireless network by using the configuration information.

After the foregoing configuration information is acquired, the foregoing wireless network can be connected to by using the configuration information.

Because the graphical code information includes encryption information, the configuration information of the wireless network can be effectively hidden. In addition, it can be implemented that only a user terminal capable of decrypting the configuration information can connect to the wireless network, that is, only a user terminal that has acquired the configuration information in advance can connect to the wireless network, so as to prevent the wireless network from being used by an unauthorized user terminal, thereby improving security of the configuration information of the wireless network.

Optionally, the foregoing method may be applied to any device having scanning and network functions, for example, a device having scanning and network functions such as a tablet computer, a mobile phone, a remote controller, a notebook computer, or a wearable device.

In the foregoing technical solution, a graphical code is scanned to acquire graphical code information carried in the graphical code, the graphical code information includes encryption information, and the encryption information is used for acquiring the configuration information of a wireless network; further, the encryption information is decrypted to acquire the configuration information; in this way, the wireless network can be connected to by using the configuration information. Because in this technical solution, it is unnecessary to receive the configuration information, input by a user, of the wireless network, the wireless network can be quickly connected to.

Figure 2:
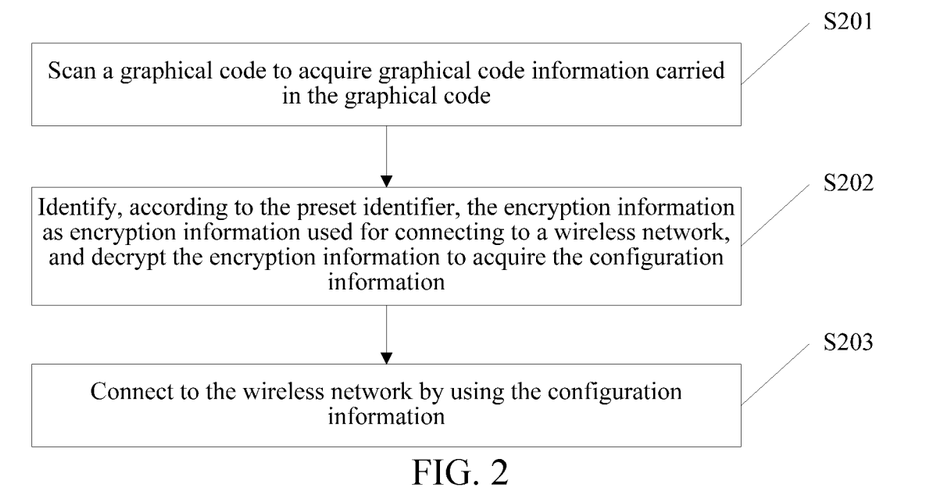
FIG. 2 is a flowchart of another wireless network connection method according to an embodiment of the present disclosure.

Referring to FIG. 2, FIG. 2 is a flowchart of another wireless network connection method according to an embodiment of the present disclosure, including:

S201: Scan a graphical code to acquire graphical code information carried in the graphical code, the graphical code information including preset identifier and encryption information acquired by encrypting configuration information of a wireless network, where the preset identifier is used for identifying the encryption information as encryption information used for connecting to the wireless network.

Optionally, the foregoing preset identifier may be any predefined information capable of identifying the encryption information as the encryption information used for connecting to the wireless network, for example, the foregoing preset identifier may be a section of characters or a specific character, or the foregoing preset identifier may be a specific website prefix or the like, which is not limited in this embodiment. For example, the foregoing graphical code information may be as follows:

http://abc.xx.com/lsdj543dkfjlsdf09844_djf2dsfm where http://abc.xx.com may be the foregoing preset identifier, and characters following the identifier may be encryption information acquired by encrypting configuration information of a wireless network. In this way, it can be implemented that the graphical code information acquired in step S201 is a piece of website information, and in this way, it can be implemented that only a user terminal capable of decrypting encryption information can acquire the configuration information of the wireless network, and a user terminal incapable of decrypting encryption information can only acquire a piece of website information, thereby improving security of the wireless network.

S202: Identify, according to the preset identifier, the encryption information as encryption information used for connecting to the wireless network, and decrypt the encryption information to acquire the configuration information.

The foregoing preset identifier can be acquired in advance, or a function of acquiring the preset identifier in advance is provided; in this way, after the foregoing graphical code information is acquired in S201, in step S202, the encryption information included in the graphical code information may be identified according to the foregoing preset identifier, and the encryption information is identified as the encryption information used for connecting the wireless network; after the identification, the encryption information may be decrypted by using a specific encryption algorithm to acquire the configuration information.

S203: Connect to the wireless network by using the configuration information.

Optionally, the encryption information included by the graphical code information may include encryption information acquired by encrypting the configuration information of the wireless network or may include encryption information acquired by encrypting an identifier of the configuration information of the wireless network. The identifier of the configuration information of the wireless network may be an identifier, for example, an ID, allocated for the configuration information by a server after acquiring the configuration information. In this way, when the encryption information included by the graphical code information is the encryption information of the identifier of the configuration information of the wireless network, the graphical code does not need to be modified if the server modifies content of the configuration information of the wireless network, for example, modifying one or more of an SSID, an encryption manner, and password information. Because the identifier of the configuration information of the wireless network always corresponds to the configuration information of the wireless network, no matter whether the configuration information is modified, the server can acquire the configuration information of the wireless network by means of the identifier. Because it is unnecessary to modify the graphical code after the configuration information of the wireless network is modified, network resources can be saved.

Optionally, when the encryption information included by the graphical code information may include encryption information acquired by encrypting the identifier of the configuration information of the wireless network, step S202 may include:

identifying, according to the preset identifier, the encryption information as encryption information used for connecting to the wireless network, decrypting the encryption information to acquire an identifier of the configuration information, and sending the identifier to a server; and receiving the configuration information returned, according to the identifier, by the server.

In this implementation manner, because the identifier of configuration information is employed, security of the wireless network is further improved. In addition, in this implementation manner, attribute information of a user terminal may also be sent to the server, so as to enable the server to collect attributes of the user terminal connected to the foregoing wireless network.

In addition, the sending the foregoing identifier to the server may specifically be encrypting the identifier by using a specific encryption algorithm and sending the encryption information acquired by encryption to the server. After receiving the encryption information, the server can perform decryption to acquire the foregoing identifier, so as to acquire the configuration information of the foregoing wireless network according to the identifier. The server further encrypts the configuration information and then returns the encrypted encryption information, and in this way, in step S202, the encryption information returned by the server can be decrypted to acquire the configuration information of the foregoing wireless network. Because information transmitted with the server is encrypted, security of the configuration information of the wireless network is further improved.

It should be noted that the implementation manner may be applied to the embodiment illustrated in FIG. 1, that is, step S102 in the embodiment illustrated in FIG. 1 may includes:

identifying, according to the preset identifier, the encryption information as encryption information used for connecting to the wireless network, decrypting the encryption information to acquire an identifier of the configuration information, and sending the identifier to a server; and receiving the configuration information returned, according to the identifier, by the server.

Optionally, the encryption information included by the graphical code information may include encryption information acquired by encrypting the configuration information of the wireless network and may include encryption information acquired by encrypting an identifier of the configuration information of the wireless network. The foregoing two situations may be distinguished by using an attribute of the graphical code information in this embodiment, so as to distinguish whether the encryption information included by the graphical code information is the encryption information acquired by encrypting the configuration information of the wireless network or the encryption information acquired by encrypting the identifier of the configuration information of the wireless network.

In step S202, after the graphical code information is acquired, whether the encryption information is the encryption information acquired by encrypting the configuration information of the wireless network or the encryption information acquired by encrypting the identifier of the configuration information of the wireless network is identified by using the attribute of the graphical code information. When it is identified that the encryption information is the encryption information acquired by encrypting the configuration information of the wireless network, the encryption information can be identified, according to the preset identifier, as the encryption information used for connecting to the wireless network and the encryption information is decrypted to acquire the configuration information. When it is identified that the encryption information is the encryption information acquired by encrypting the identifier of the configuration information of the wireless network, the encryption information can be identified, according to the preset identifier, as the encryption information used for connecting to the wireless network, the encryption information is decrypted to acquire the identifier of the configuration information, the identifier is sent to the server, and the configuration information returned, according to the identifier, by the server is received.

The attribute of the graphical code information may include, but not limited to, a format, a character type, and the like of the graphical code information.

In addition, the foregoing only introduces that the encryption information may be distinguished by using the attribute of the graphical code information, which is not limited in this embodiment, for example, the encryption information may also be distinguished by adding a specific character to the graphical code information, where the character is used for distinguishing the encryption information, or the encryption information may also be distinguished according to positions of respective pieces of information in the graphical code information, or the like.

Optionally, the foregoing graphical code information may also include extended information, where the extended information may include, but not limited to, at least one of the following:

display information, link information, and an application identifier. The display information may be any information capable of being displayed on the user terminal, for example, a business name, a welcome slogan after the wireless network is connected to, and the like. That is, the method may also include:

displaying the extended information.

In this way, it can be implemented that after the wireless network is connected to, the extended information can be displayed, so as to improve user experience.

Alternatively, the method may also include:

opening a page or an application corresponding to the extended information. For example, if the foregoing extended information is link information, a page corresponding to the link information can be quickly opened, or if the foregoing extended information is an identifier of an application, the application can be quickly started.

Optionally, the foregoing method may be applied to any device having scanning and network functions, for example, a device having scanning and network functions such as a tablet computer, a mobile phone, a remote controller, a notebook computer, or a wearable device.

In foregoing technical solution, multiple optional implementation manners are added on the basis of the first embodiment and all can implement a fast connection to the wireless network.

Figure 3:
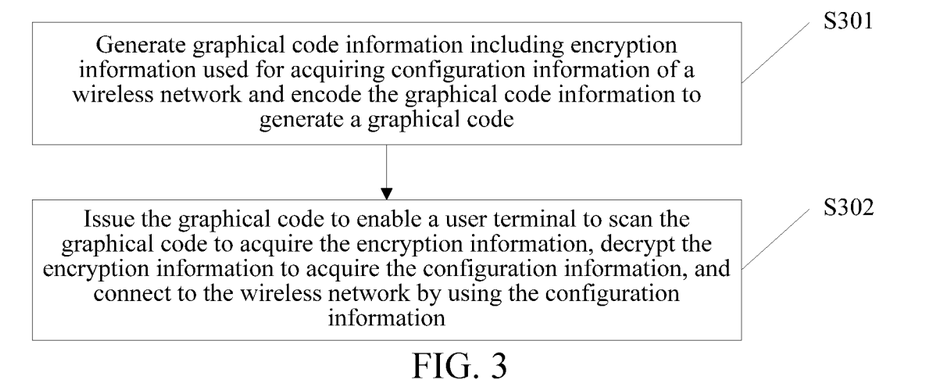
FIG. 3 is a flowchart of another wireless network connection method according to an embodiment of the present disclosure.

Referring to FIG. 3, FIG. 3 is a flowchart of another wireless network connection method according to an embodiment of the present disclosure, including:

S301: Generate graphical code information including encryption information used for acquiring configuration information of a wireless network and encode the graphical code information to generate a graphical code.

Optionally, step S301 may specifically be receiving the input configuration information of the wireless network and further generating the foregoing graphical code, for example, receiving configuration information, input by a user, of the wireless network. In addition, an encryption algorithm of the foregoing encryption is an encryption algorithm pre-negotiated with a user terminal.

S302: Issue the graphical code to enable a user terminal to scan the graphical code to acquire the encryption information, decrypt the encryption information to acquire the configuration information, and connect to the wireless network by using the configuration information.

Optionally, the foregoing issuing a graphical code may be displaying the graphical code, for example, displaying the graphical code by means of a page, or may be printing the graphical code.

Optionally, the foregoing generating graphical code information including encryption information used for acquiring configuration information of a wireless network may include:

encrypting the configuration information of the wireless network to acquire encryption information and generating graphical code information including the encryption information and a preset identifier, where the preset identifier is used for identifying the encryption information as encryption information used for connecting to the wireless network.

Optionally, the foregoing preset identifier may be any predefined information capable of identifying the encryption information as the encryption information used for connecting to the wireless network, for example, the foregoing preset identifier may be a section of characters or a specific character, or the foregoing preset identifier may be a specific website prefix or the like, which is not limited in this embodiment. For example, the foregoing graphical code information may be as follows:

http://abc.xx.com/lsdj543dkfjlsdf09844_djf2dsfm where http://abc.xx.com may be the foregoing preset identifier, and characters following the identifier may be encryption information acquired by encrypting configuration information of a wireless network. In this way, it can be implemented that the graphical code information acquired by the user terminal is a piece of website information, and in this way, it can be implemented that only a user terminal capable of decrypting encryption information can acquire the configuration information of the wireless network, and a user terminal incapable of decrypting encryption information can only acquire a piece of website information, thereby improving security of the wireless network.

Optionally, the foregoing generating graphical code information including encryption information used for acquiring configuration information of a wireless network may include:

encrypting an identifier of the configuration information of the wireless network to acquire encryption information and generating graphical code information including the encryption information and a preset identifier, where the preset identifier is used for identifying the encryption information as encryption information used for connecting to the wireless network.

In this embodiment, the method may also include:

receiving the identifier sent by the user terminal, acquiring, according to the identifier, configuration information of the wireless network, and sending the configuration information to the user terminal.

Optionally, after the identifier sent by the user terminal is received, attribute information, for example, a type and/or a version number of a client used by the user terminal for implementing the method, a model number of the user terminal, or the like, sent by the user terminal can also be received at the same time. In this way, this embodiment may implement collecting attribute information of user terminals connected to wireless network, so as to perform computation according to the collected attribute information. The process and the like may also be perfected according to statistical result.

Optionally, in particular, after the configuration information of the wireless network is received, an identifier, for example, an ID, may be allocated for the configuration information. In this way, it can be implemented that the graphical code information only includes the identifier of the configuration information instead of the configuration information, so as to improve security of the configuration information. In addition, when it is necessary to modify content of the configuration information, for example, when information, such as an SSID, password information, or an encryption manner of the wireless network, is modified, it is only necessary to update content of the configuration information corresponding to the identifier, and it is unnecessary to modify the graphical code. Because the identifier of the configuration information of the wireless network always corresponds to the configuration information of the wireless network, no matter whether the configuration information is modified, the configuration information of the wireless network can be acquired by means of the identifier. Because it is unnecessary to modify the graphical code after the configuration information of the wireless network is modified, network resources can be saved. For example, the method may also include:

modifying content of the configuration information of the wireless network;

the foregoing receiving the identifier sent by the user terminal, acquiring, according to the identifier, configuration information of the wireless network, and sending the configuration information to the user terminal may include:

receiving the identifier sent by the user terminal, acquiring, according to the identifier, the modified configuration information of the wireless network, and sending the configuration information to the user terminal.

Optionally, the graphical code information further includes extended information, so as to enable the user terminal after being connected to the wireless network to display the extended information or open a page or an application corresponding to the extended information.

The extended information includes at least one of the following:

display information, link information, and an application identifier.

The display information may be any information capable of being displayed on the user terminal, for example, a business name, a welcome slogan after the wireless network is connected to, and the like. In this way, it can be implemented that after the user terminal is connected to the wireless network, the extended information can be displayed, so as to improve user experience. Alternatively, a page or an application can be quickly opened by using the user terminal. For example, if the foregoing extended information is link information, a page corresponding to the link information can be quickly opened, or if the foregoing extended information is an identifier of an application, the application can be quickly started.

Optionally, the foregoing introduces multiple types of graphical code information, for example, graphical code information including a preset identifier and encryption information acquired by encrypting configuration information of a wireless network, graphical code information including a preset identifier and encryption information acquired by encrypting an identifier of configuration information of a wireless network, or graphical code information including extended information, a preset identifier, and encryption information acquired by encrypting an identifier of configuration information of a wireless network. Moreover, security levels of different types of graphical code information are different, so that security level definition can be performed on the graphical code information in this embodiment, for example, three levels can be defined: a first level (for example, low-not encrypted), a second level (for example, middle-locally encrypted), and a third level (for example, high-online encrypted). Graphical code information of the first level may include configuration information of a wireless network and may also include extended information, a security level of the graphical code information of this level is relatively low, and the configuration information is not encrypted, but the graphical code information of this level can be used for quickly connecting to the wireless network; graphical code information of the second level may include a preset identifier and graphical code information of encryption information acquired by encrypting configuration information of a wireless network and may also include extended information, and because the graphical code information of this level can implement local decryption by a user terminal, the user terminal can still be connected to the wireless network in a situation in which the user terminal is not online; graphical code information of the third level may include a preset identifier and graphical code information of encryption information acquired by encrypting an identifier of configuration information of a wireless network and may also include extended information, and because the graphical code information does not include configuration information of the wireless network, its security level is the highest.

Figure 4:
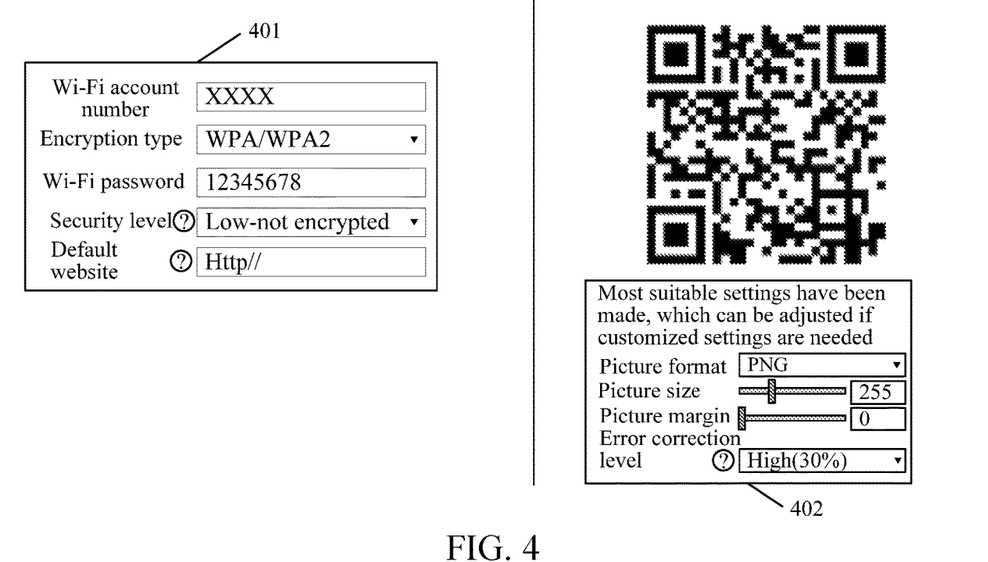
FIG. 4 is an optimal schematic diagram of generating a graphical code according to an embodiment of the present disclosure.

Reference may be made to FIG. 4 for a specific process of generating the foregoing graphical code. As shown in an interface illustrated in FIG. 4, a user may input an account number, an encryption type, a password, a security level, and extended information of a wireless network in a configuration information input box 401 and necessarily may also select a configuration parameter of a graphical code in a configuration parameter input box 402 of the graphical code. After the pieces of information are all filled in, a server may generate a corresponding graphical code. In particular, the server may provide the interface illustrated in FIG. 4, and a user inputs corresponding information on the interface to generate a graphical code.

Optionally, the foregoing method may be applied to the server.

In the foregoing technical solution, graphical code information including encryption information used for acquiring configuration information of a wireless network is generated, and the graphical code information is encoded to generate a graphical code; the graphical code is issued, so that a user terminal can scan the graphical code to acquire the encryption information, decrypt the encryption information to acquire the configuration information, and connect to the wireless network by using the configuration information. Hence, a fast connection to a wireless network can be implemented.

Figure 5:
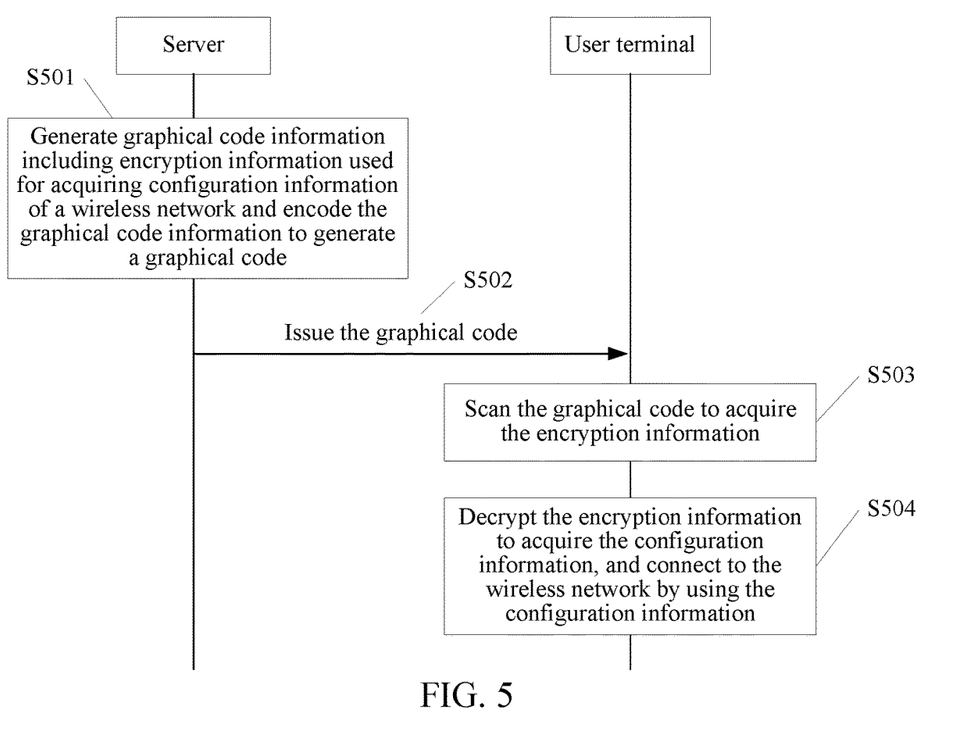
FIG. 5 is a schematic diagram of another wireless network connection method according to an embodiment of the present disclosure.

Referring to FIG. 5, FIG. 5 is a schematic diagram of another wireless network connection method according to an embodiment of the present disclosure, including:

S501: Generate, by a server, graphical code information including encryption information used for acquiring configuration information of a wireless network and encode the graphical code information to generate a graphical code.

S501: Issue, by the server, the graphical code.

S503: Scan, by a user terminal, the graphical code to acquire the encryption information.

S504: Decrypt, by the user terminal, the encryption information to acquire the configuration information and connect to the wireless network by using the configuration information.

This embodiment is drafted from the perspective of two sides, where reference may be made to various implementation manners introduced in the embodiment illustrated in FIG. 3 for all implementation manners on a server side, and reference may be made to various implementation manners introduced in the embodiments illustrated in FIG. 1 and FIG. 2 for all implementation manners on a user terminal side, and no repeated explanation is made therein.

In the foregoing technical solution, a fast connection to a wireless network can be implemented.

Figure 6:
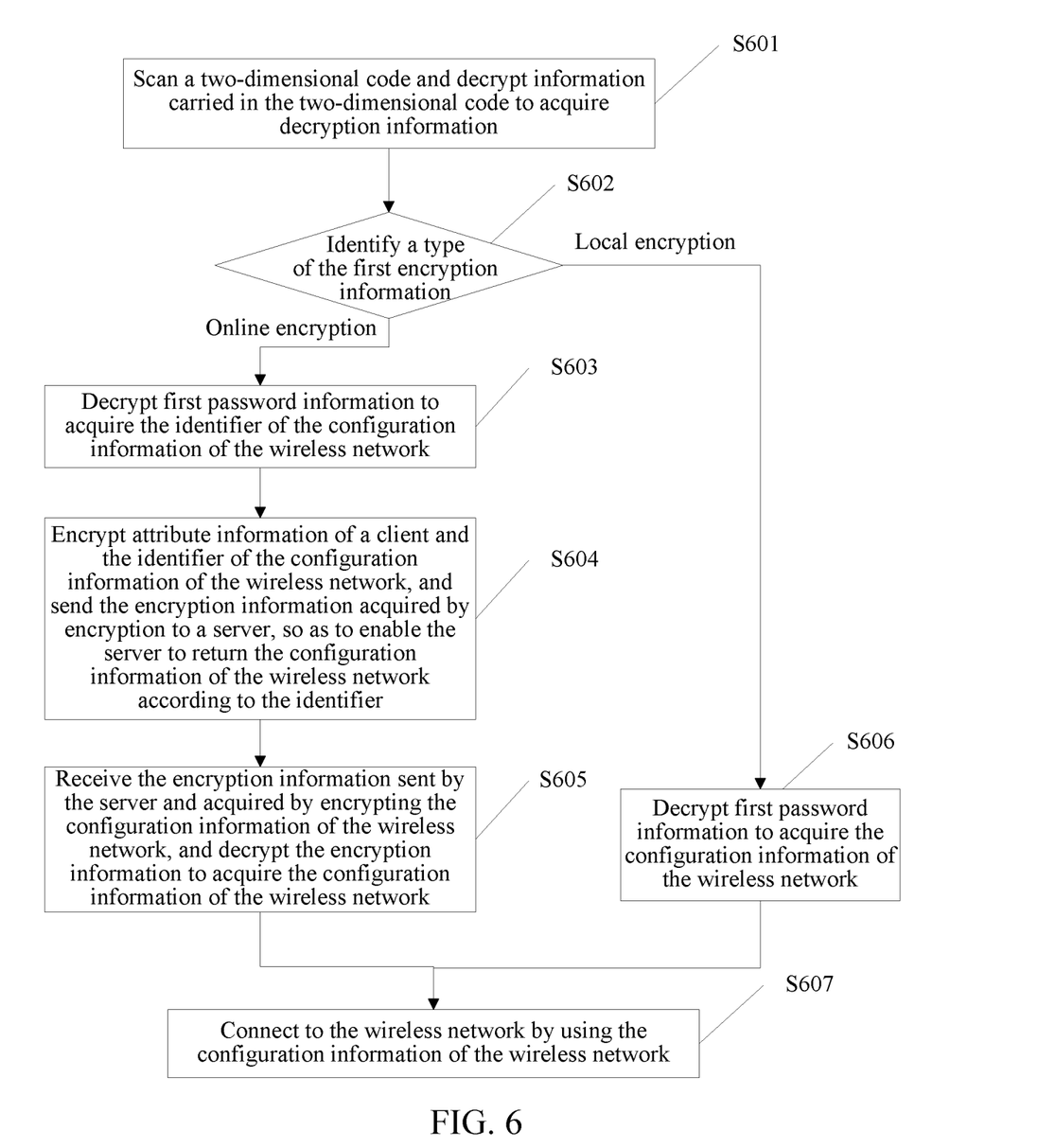
FIG. 6 is a flowchart of another wireless network connection method according to an embodiment of the present disclosure.

Referring to FIG. 6, FIG. 6 is a flowchart of another wireless network connection method according to an embodiment of the present disclosure, including:

S601: Scan a two-dimensional code and decrypt information carried in the two-dimensional code to acquire decryption information, where the decryption information includes a preset identifier and first encryption information, and the decryption information may be a Uniform Resource Locator (URL).

S602: Identify a type of the first encryption information, perform step S603 when the type of the first encryption information is an online encryption type, and perform step S606 when the type of the first encryption information is a local encryption type, where the online encryption type indicates that the first encryption information is encryption information acquired by encrypting an identifier of configuration information of a wireless network, and the local encryption type indicates that the foregoing encryption information is encryption information acquired by encrypting configuration information of a wireless network.

S603: Decrypt first password information to acquire the identifier of the configuration information of the wireless network.

S604: Encrypt attribute information of a client and the identifier of the configuration information of the wireless network, and send the encryption information acquired by encryption to a server, so as to enable the server to return the configuration information of the wireless network according to the identifier.

S605: Receive the encryption information sent by the server and acquired by encrypting the configuration information of the wireless network, and decrypt the encryption information to acquire the configuration information of the wireless network.

S606: Decrypt first password information to acquire the configuration information of the wireless network.

S607: Connect to the wireless network by using the configuration information of the wireless network.

In the foregoing technical solution, a fast connection to a wireless network can be implemented.

Figure 7:
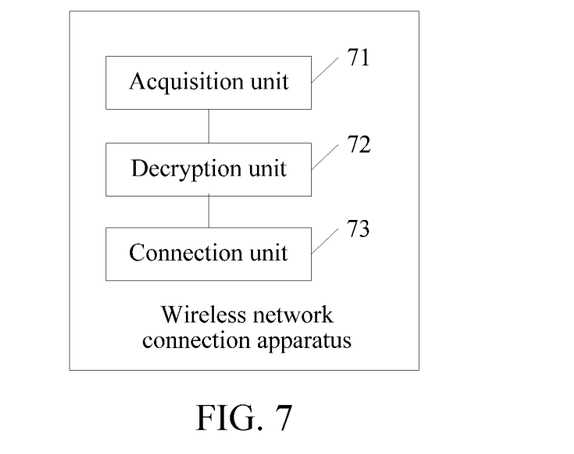
FIG. 7 is a structural schematic diagram of a wireless network connection apparatus according to an embodiment of the present disclosure.

Referring to FIG. 7, FIG. 7 is a structural schematic diagram of a wireless network connection apparatus according to an embodiment of the present disclosure, which, as shown in FIG. 7, includes: an acquisition unit 71, a decryption unit 72, and a connection unit 73.

the acquisition unit 71 is configured to scan a graphical code to acquire graphical code information carried in the graphical code, where the graphical code information includes encryption information, and the encryption information is used for acquiring the configuration information of a wireless network;

After the acquisition unit 71 scans the foregoing graphical code, the graphical code can be decrypted to acquire the foregoing graphical code information. In addition, the foregoing scanning a graphical code may be scanning a graphical code in a certain page, for example, scanning a graphical code issued by a server; alternatively, a graphical code on a certain object, for example, a graphical code adhered to a wall and the like, can be scanned, which is not limited in this embodiment.

Optionally, an encryption algorithm of the foregoing encryption information is a specific algorithm pre-negotiated by a server and a user terminal.

The decryption unit 72 is configured to decrypt the encryption information to acquire the configuration information.

After the foregoing graphical code information is acquired, the foregoing encryption information can be acquired, so that the decryption unit 72 may decrypt the encryption information by using an encryption algorithm of the encryption information to acquire the foregoing configuration information, for example, performing decryption by using the specific algorithm pre-negotiated by the server and the user terminal as introduced above.

The connection unit 73 is configured to connect to the wireless network by using the configuration information.

After the foregoing configuration information is acquired, the foregoing wireless network can be connected to by using the configuration information.

Because the graphical code information includes encryption information, the configuration information of the wireless network can be effectively hidden. In addition, it can be implemented that only the user terminal that can decrypt the configuration information can connect to the wireless network, that is, only the user terminal that has acquired the configuration information in advance can connect to the wireless network, so as to prevent the wireless network from being used by an unauthorized user terminal, thereby improving security of the configuration information of the wireless network.

Optionally, the foregoing graphical code information may include a preset identifier and the encryption information acquired by encrypting the configuration information of the wireless network, where the preset identifier is used for identifying the encryption information as encryption information used for connecting to the wireless network.

The decryption unit 72 is configured to identify, according to the preset identifier, the encryption information as encryption information used for connecting to the wireless network, and decrypt the encryption information to acquire the configuration information.

Optionally, the foregoing preset identifier may be any predefined information capable of identifying the encryption information as the encryption information used for connecting to the wireless network, for example, the foregoing preset identifier may be a section of characters or a specific character, or the foregoing preset identifier may be a specific website prefix or the like, which is not limited in this embodiment. For example, the foregoing graphical code information may be as follows:

http://abc.xx.com/lsdj543dkfjlsdf09844_djf2dsfm where http://abc.xx.com may be the foregoing preset identifier, and characters following the identifier may be encryption information acquired by encrypting configuration information of a wireless network. In this way, it can be implemented that the graphical code information acquired by the acquisition unit 71 is a piece of website information, and in this way, it can be implemented that only a user terminal capable of decrypting encryption information can acquire the configuration information of the wireless network, and a user terminal incapable of decrypting encryption information can only acquire a piece of website information, thereby improving security of the wireless network.

Optionally, the foregoing graphical code information may include a preset identifier and the encryption information acquired by encrypting the configuration information of the wireless network, where the preset identifier is used for identifying the encryption information as encryption information used for connecting to the wireless network.

The decryption unit 72 is configured to identify, according to the preset identifier, the encryption information as encryption information used for connecting to the wireless network, decrypt the encryption information to acquire an identifier of the configuration information, and send the identifier to a server; and receive the configuration information returned, according to the identifier, of the server.

The identifier of the configuration information of the wireless network may be an identifier, for example, an ID, allocated for the configuration information by a server after acquiring the configuration information. In this way, when the encryption information included by the graphical code information is the encryption information of the identifier of the configuration information of the wireless network, the graphical code does not need to be modified if the server modifies content of the configuration information of the wireless network, for example, modifying one or more of an SSID, an encryption manner, and password information. Because the identifier of the configuration information of the wireless network always corresponds to the configuration information of the wireless network, no matter whether the configuration information is modified, the server can acquire the configuration information of the wireless network by means of the identifier. Because it is unnecessary to modify the graphical code after the configuration information of the wireless network is modified, network resources can be saved.

In this implementation manner, because the identifier of configuration information is employed, security of the wireless network is further improved. In addition, in this implementation manner, attribute information of a user terminal may also be sent to the server, so as to enable the server to collect attributes of the user terminal connected to the foregoing wireless network.

In addition, the sending the foregoing identifier to the server may specifically be encrypting the identifier by using a specific encryption algorithm and sending the encryption information acquired by encryption to the server. After receiving the encryption information, the server can perform decryption to acquire the foregoing identifier, so as to acquire the configuration information of the foregoing wireless network according to the identifier. The server further encrypts the configuration information and then returns the encrypted encryption information, and in this way, the decryption unit 72 can decrypt the encryption information returned by the server to acquire the configuration information of the foregoing wireless network. Because information transmitted with the server is encrypted, security of the configuration information of the wireless network is further improved.

Optionally, the encryption information included by the graphical code information may include encryption information acquired by encrypting the configuration information of the wireless network and may include encryption information acquired by encrypting an identifier of the configuration information of the wireless network. The foregoing two situations may be distinguished by using an attribute of the graphical code information in this embodiment, so as to distinguish whether the encryption information included by the graphical code information is the encryption information acquired by encrypting the configuration information of the wireless network or the encryption information acquired by encrypting the identifier of the configuration information of the wireless network.

In this way, after the decryption unit 72 acquires the graphical code information, whether the encryption information is the encryption information acquired by encrypting the configuration information of the wireless network or the encryption information acquired by encrypting the identifier of the configuration information of the wireless network is identified by using the attribute of the graphical code information. When it is identified that the encryption information is the encryption information acquired by encrypting the configuration information of the wireless network, the encryption information can be identified, according to the preset identifier, as the encryption information used for connecting to the wireless network and the encryption information is decrypted to acquire the configuration information. When it is identified that the encryption information is the encryption information acquired by encrypting the identifier of the configuration information of the wireless network, the encryption information can be identified, according to the preset identifier, as the encryption information used for connecting to the wireless network, the encryption information is decrypted to acquire the identifier of the configuration information, the identifier is sent to the server, and the configuration information returned, according to the identifier, by the server is received.

The attribute of the graphical code information may include, but not limited to, a format, a character type, and the like of the graphical code information.

In addition, the foregoing only introduces that the encryption information may be distinguished by using the attribute of the graphical code information, which is not limited in this embodiment, for example, the encryption information may also be distinguished by adding a specific character to the graphical code information, where the character is used for distinguishing the encryption information, or the encryption information may also be distinguished according to positions of respective pieces of information in the graphical code information, or the like.

Optionally, the foregoing graphical code information may also include extended information, where the extended information may include, but not limited to, at least one of the following:

display information, link information, and an application identifier. The display information may be any information capable of being displayed on the user terminal, for example, a business name, a welcome slogan after the wireless network is connected to, and the like.

Figure 8:
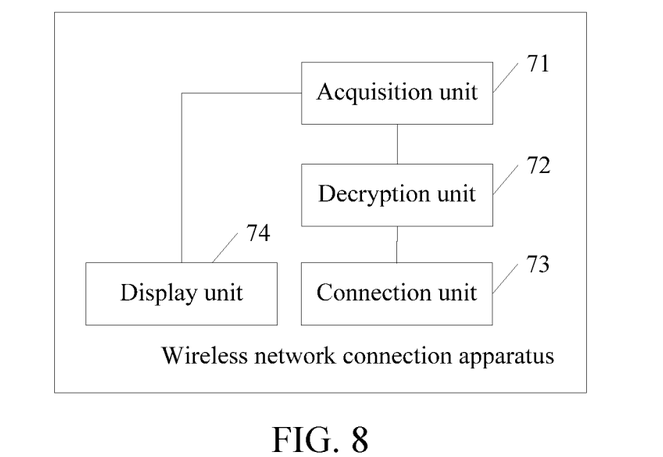
FIG. 8 is a structural schematic diagram of another wireless network connection apparatus according to an embodiment of the present disclosure.

As shown in FIG. 8, the apparatus may also include:

a display unit 74, configured to display the extended information.

In this way, it can be implemented that after the wireless network is connected to, the extended information can be displayed, so as to improve user experience.

Figure 9:
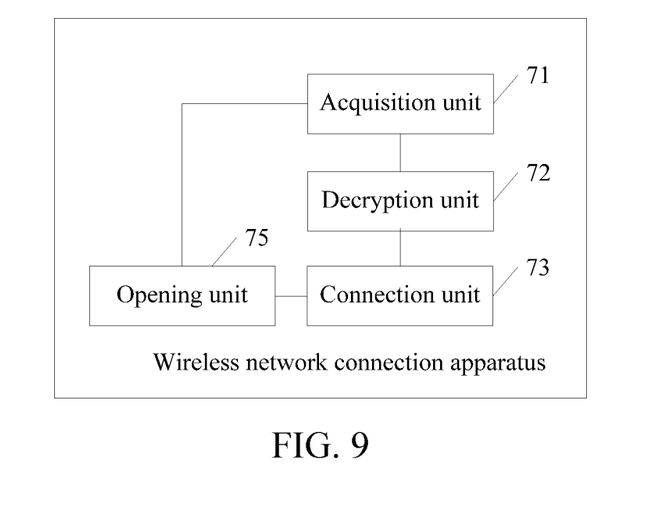
FIG. 9 is a structural schematic diagram of another wireless network connection apparatus according to an embodiment of the present disclosure.

Alternatively, as shown in FIG. 9, the apparatus may also include:

an opening unit 75, configured to open a page or an application corresponding to the extended information. For example, if the foregoing extended information is link information, a page corresponding to the link information can be quickly opened, or if the foregoing extended information is an identifier of an application, the application can be quickly started.

Optionally, the foregoing apparatus may be applied to any device having scanning and network functions, for example, a device having scanning and network functions such as a tablet computer, a mobile phone, a remote controller, a notebook computer, or a wearable device.

In the foregoing technical solution, a graphical code is scanned to acquire graphical code information carried in the graphical code, the graphical code information includes encryption information, and the encryption information is used for acquiring the configuration information of a wireless network; further, the encryption information is decrypted to acquire the configuration information; in this way, the wireless network can be connected to by using the configuration information. Because in this technical solution, it is unnecessary to receive the configuration information, input by a user, of the wireless network, the wireless network can be quickly connected to.

Figure 10:
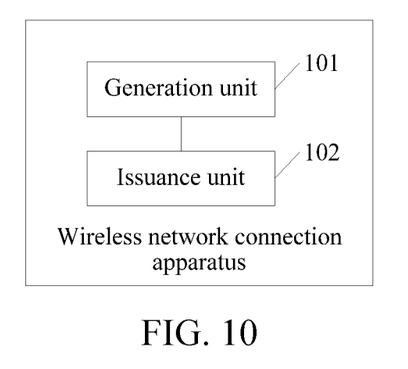
FIG. 10 is a structural schematic diagram of another wireless network connection apparatus according to an embodiment of the present disclosure.

Referring to FIG. 10, FIG. 10 is a structural schematic diagram of another wireless network connection apparatus according to an embodiment of the present disclosure, which, as shown in FIG. 10, includes: a generation unit 101 and an issuance unit 102.

The generation unit 101 is configured to generate graphical code information including encryption information used for acquiring configuration information of a wireless network and encode the graphical code information to generate a graphical code.

Optionally, the generation unit 101 may specifically receive the input configuration information of the wireless network and further generate the foregoing graphical code, for example, receive configuration information, input by a user, of the wireless network. In addition, an encryption algorithm of the foregoing encryption is an encryption algorithm pre-negotiated with a user terminal.

The issuance unit 102 is configured to issue the graphical code to enable a user terminal to scan the graphical code to acquire the encryption information, decrypt the encryption information to acquire the configuration information, and connect to the wireless network by using the configuration information.

Optionally, the foregoing issuing a graphical code may be displaying the graphical code, for example, displaying the graphical code by means of a page, or may be printing the graphical code.

Optionally, the generation unit 101 may be configured to encrypt the configuration information of the wireless network to acquire encryption information and generate graphical code information including the encryption information and a preset identifier, where the preset identifier is used for identifying the encryption information as encryption information used for connecting to the wireless network.

Optionally, the foregoing preset identifier may be any predefined information capable of identifying the encryption information as the encryption information used for connecting to the wireless network, for example, the foregoing preset identifier may be a section of characters or a specific character, or the foregoing preset identifier may be a specific website prefix or the like, which is not limited in this embodiment. For example, the foregoing graphical code information may be as follows:

http://abc.xx.com/lsdj543dkfjlsdf09844_djf2dsfm where http://abc.xx.com may be the foregoing preset identifier, and characters following the identifier may be encryption information acquired by encrypting configuration information of a wireless network. In this way, it can be implemented that the graphical code information acquired by the user terminal is a piece of website information, and in this way, it can be implemented that only a user terminal capable of decrypting encryption information can acquire the configuration information of the wireless network, and a user terminal incapable of decrypting encryption information can only acquire a piece of website information, thereby improving security of the wireless network.

Optionally, the generation unit 101 may be configured to encrypt the identifier of the configuration information of the wireless network to acquire encryption information and generate graphical code information including the encryption information and a preset identifier, where the preset identifier is used for identifying the encryption information as encryption information used for connecting to the wireless network.

Figure 11:
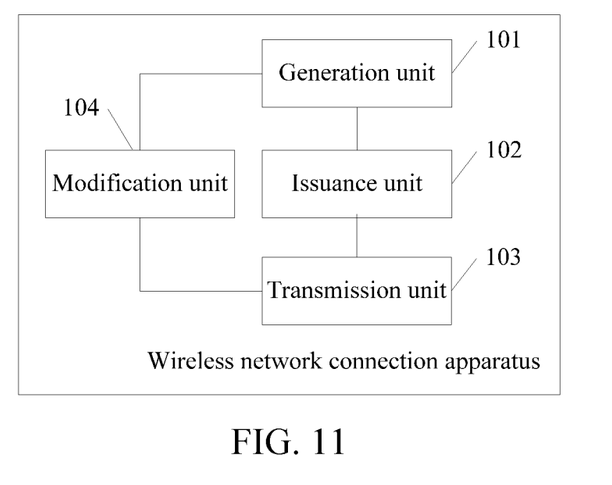
FIG. 11 is a structural schematic diagram of another wireless network connection apparatus according to an embodiment of the present disclosure.

As shown in FIG. 11, the apparatus may also include:

a transmission unit 103, configured to receive the identifier sent by the user terminal, acquire, according to the identifier, configuration information of the wireless network, and send the configuration information to the user terminal.

Optionally, after the identifier sent by the user terminal is received, attribute information, for example, a type and/or a version number of a client used by the user terminal for implementing the method, a model number of the user terminal, or the like, sent by the user terminal can also be received at the same time. In this way, this embodiment may implement collecting attribute information of user terminals connected to wireless network, so as to perform computation according to the collected attribute information. The process and the like may also be perfected according to statistical result.

Optionally, in particular, after the configuration information of the wireless network is received, an identifier, for example, an ID, may be allocated for the configuration information. In this way, it can be implemented that the graphical code information only includes the identifier of the configuration information instead of the configuration information, so as to improve security of the configuration information. In addition, when it is necessary to modify content of the configuration information, for example, when information, such as an SSID, password information, or an encryption manner of the wireless network, is modified, it is only necessary to update content of the configuration information corresponding to the identifier, and it is unnecessary to modify the graphical code, so that network resources are saved. Because the identifier of the configuration information of the wireless network always corresponds to the configuration information of the wireless network, no matter whether the configuration information is modified, the configuration information of the wireless network can be acquired by means of the identifier. Because it is unnecessary to modify the graphical code after the configuration information of the wireless network is modified, network resources can be saved. For example, the apparatus may also include:

a modification unit 104, configured to modify content of the configuration information of the wireless network; and the transmission unit 103 capable of being configured to receive the identifier sent by the user terminal, acquire, according to the identifier, the modified configuration information of the wireless network, and send the configuration information to the user terminal.

Optionally, the graphical code information further includes extended information, so as to enable the user terminal after being connected to the wireless network to display the extended information or open a page or an application corresponding to the extended information.

The extended information includes at least one of the following:

display information, link information, and an application identifier.

The display information may be any information capable of being displayed on the user terminal, for example, a business name, a welcome slogan after the wireless network is connected to, and the like. In this way, it can be implemented that after the user terminal is connected to the wireless network, the extended information can be displayed, so as to improve user experience. Alternatively, a page or an application can be quickly opened by using the user terminal. For example, if the foregoing extended information is link information, a page corresponding to the link information can be quickly opened, or if the foregoing extended information is an identifier of an application, the application can be quickly started.

Optionally, the foregoing apparatus may be applied to the server.

In the foregoing technical solution, graphical code information including encryption information used for acquiring configuration information of a wireless network is generated, and the graphical code information is encoded to generate a graphical code; the graphical code is issued, so that a user terminal can scan the graphical code to acquire the encryption information, decrypt the encryption information to acquire the configuration information, and connect to the wireless network by using the configuration information. Hence, a fast connection to a wireless network can be implemented.

Figure 12:
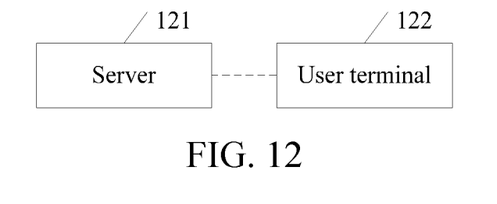
FIG. 12 is a structural schematic diagram of a wireless network connection system according to an embodiment of the present disclosure.

Referring to FIG. 12, FIG. 12 is a structural schematic diagram of a wireless network connection system according to an embodiment of the present disclosure, which, as shown in FIG. 12, includes: a server 121 and a user terminal 122.

The server 121 is configured to generate graphical code information including encryption information used for acquiring configuration information of a wireless network and encode the graphical code information to generate a graphical code; and issue the graphical code.

The user terminal 122 is configured to scan the graphical code to acquire the encryption information; and decrypt the encryption information to acquire the configuration information and connect to the wireless network by using the configuration information.

Optionally, reference may also be made to implementation manners of the apparatus in the embodiments illustrated in FIG. 10 and FIG. 11 for implementation manners of the server in the present embodiment, and no repeated explanation is made therein. In addition, reference may also be made to implementation manners of the apparatus in the embodiments illustrated in FIG. 7, FIG. 8, and FIG. 9 for implementation manners of the user terminal in the present embodiment, and no repeated explanation is made therein.

In the foregoing technical solution, a fast connection to a wireless network can be implemented.

A person of ordinary skill in the art may understand that, all or a part of the processes of the foregoing method embodiments may be implemented by a computer program instructing relevant hardware. The foregoing program may be stored in a computer readable storage medium. When the program runs, the steps of the foregoing method embodiments are performed. The foregoing storage medium may be a hard disk, an optical disc, a read-only memory (ROM), a random access memory (RAM), or the like.

The above disclosures are merely preferred embodiments of the present disclosure and certainly cannot be used to limit the scope of the claims of the present disclosure. Therefore, any equivalent change made according to the claims of the present disclosure modification still falls within the scope of the present disclosure.

What is claimed is:

1. A method for sending information required by a user terminal, comprising:

scanning a graphical code to acquire graphical code information carried in the graphical code, the graphical code information comprises encryption information acquired by encrypting an identifier of configuration information of an extended information and a preset identifier for identifying that the encryption information for implementing the extended information; wherein the configuration information is input by a user on a server;

decrypting the encryption information to acquire the configuration information of the extended information, wherein decrypting the encryption information comprises:

identifying, according to the preset identifier, the encryption information in the graphical code information;

decrypting the encryption information to acquire the identifier of the configuration information, wherein the identifier of the configuration information is an identifier allocated for the configuration information by the server after the configuration information of the extended information is received;

sending the identifier to the server;

receiving the configuration information returned, according to the identifier, by the server which further comprises: receiving modified configuration information returned, according to the identifier without updating the graphical code, by the server, in a case that the configuration information of the extended information is modified at the server; and implementing the extended information by using the configuration information, wherein the method is performed on a user terminal.

2. The method according to claim 1, wherein the extended information comprises display information that comprises a business name and a welcome slogan of a wireless network, wherein the method comprises: displaying the extended information.

3. The method according to claim 1, wherein the extended information comprises link information, wherein the method comprises: displaying the extended information.

4. The method according to claim 1, wherein the extended information comprises an application identifier, wherein the method comprises: opening an application corresponding to the application identifier.

5. The method according to claim 1, wherein the method further comprises:

encrypting the identifier and sending encrypted identifier to the server; receiving configuration information encrypted and returned, according to the identifier, by the server; and decrypting the configuration information encrypted and returned by the server to acquire the configuration information of the extended information.

6. An apparatus for sending information required by a user terminal, comprising:

a processor and a memory storing one or more programs, the one or more programs comprising instructions, when executed by a server, cause the processor to scan a graphical code to acquire graphical code information carried in the graphical code;

wherein the graphical code information comprises encryption information acquired by encrypting an identifier of configuration information of an extended information and a preset identifier for identifying that the encryption information for implementing the extended information is included in the graphical code information;

wherein the configuration information is input by a user on the server;

decrypt the encryption information to acquire the configuration information of the extended information which comprises:

identifying, according to the preset identifier, the encryption information in the graphical code information;

decrypting the encryption information to acquire the identifier of the configuration information, wherein the identifier of the configuration information is an identifier allocated for the configuration information by the server after the configuration information of the extended information is received;

sending the identifier to the server;

receiving the configuration information returned, according to the identifier, by the server which further comprises: receiving modified configuration information returned, according to the identifier without updating the graphical code, by the server, in a case that the configuration information of the extended information is modified at the server; and implement the extended information by using the configuration information.

7. The apparatus according to claim 6, wherein the extended information comprises at least one of display information, link information, and an application identifier and wherein the instructions, when executed by the server, further cause the processor to display the extended information based on the display information that comprises a business name and a welcome slogan of a wireless network; or open a page corresponding to the link information; or open an application corresponding to the application identifier.

8. A system for sending information required by a user terminal, comprising a server and a user terminal, wherein the server is configured to:

receive configuration information, input by a user, of an extended information;

generate graphical code information comprising encryption information acquired by encrypting an identifier of the configuration information of the extended information to generate a graphical code;

allocate an identifier for the configuration information after the configuration information of the extended information is received in an initial reception of the configuration information of the extended information;

generate graphical code information, comprising the encryption information which is acquired by encrypting the identifier for the configuration information of the extended information and a preset identifier for identifying that the encryption information for implementing the extended information is included in the graphical code information, to generate a graphical code;

issue the graphical code corresponding to the identifier;

update the configuration information corresponding to the identifier in a case that said configuration information is modified by the user;

wherein in a subsequent graphical code scanning after the configuration information is updated, the server is further configured to:

receive the identifier sent by the user terminal;

acquire, according to the identifier, modified configuration information of the extended information based on the identifier; and send the modified configuration information to the user terminal; and the user terminal is configured to:

scan the graphical code to acquire the encryption information;

decrypt the encryption information to acquire the configuration information;

implement the extended information by using the configuration information;

identify, according to the preset identifier, the encryption information in the graphical code information;

decrypt the encryption information to acquire the identifier of the configuration information;

send the identifier to the server; and receive the modified configuration information returned by the server.

9. The system according to claim 8, wherein the user terminal is further configured to:

encrypt the identifier and sending encrypted identifier to the server; receive configuration information encrypted and returned by the server; and decrypt the configuration information encrypted and returned by the server to acquire the configuration information of the extended information.

* * * * *